(12) United States Patent
Huang et al.

(10) Patent No.: US 9,154,932 B2
(45) Date of Patent: Oct. 6, 2015

(54) METHOD FOR ESTABLISHMENT OF AN EMERGENCY CALL

(71) Applicant: Huawei Technologies Co., Ltd., Shenzhen, Guangdong (CN)

(72) Inventors: Jinbo Huang, Shanghai (CN); Jakob Singvall, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 14/186,666

(22) Filed: Feb. 21, 2014

(65) Prior Publication Data

US 2015/0056943 A1   Feb. 26, 2015

Related U.S. Application Data

(63) Continuation of application No. PCT/EP2013/067390, filed on Aug. 31, 2013.

(51) Int. Cl.
*H04M 11/04* (2006.01)
*H04W 4/22* (2009.01)
*H04W 88/06* (2009.01)
*H04M 3/51* (2006.01)
*H04W 76/00* (2009.01)

(52) U.S. Cl.
CPC .............. *H04W 4/22* (2013.01); *H04M 3/5116* (2013.01); *H04W 76/007* (2013.01); *H04W 88/06* (2013.01); *H04M 2242/04* (2013.01)

(58) Field of Classification Search
USPC ........................................................ 455/404.1
See application file for complete search history.

(56) References Cited

U.S. PATENT DOCUMENTS

| | | | |
|---|---|---|---|
| 7,684,315 B1* | 3/2010 | Beser | 370/219 |
| 2008/0227427 A1 | 9/2008 | Kadavallur et al. | |
| 2013/0329639 A1* | 12/2013 | Wietfeldt et al. | 370/328 |

FOREIGN PATENT DOCUMENTS

WO   WO 2008027627 A1   3/2008

* cited by examiner

*Primary Examiner* — Joel Ajayi
(74) *Attorney, Agent, or Firm* — Leydig, Voit & Mayer, Ltd.

(57) ABSTRACT

The present invention relates to a method in a communication device for establishment of an emergency call, the communication device configured to communicate within communication networks by communication modems; the method comprising the steps of: sending an Emergency Call Establishment Request (ECER) to modems $(M_1, M_2, \ldots, M_N)$ of the communication device upon receiving an emergency call initiation signal; receiving at least one ECER feedback signal from each modem, the ECER feedback signal indicating at least one of a latency and a signal quality for a communication link associated with each modem; and selecting one modem $M_n$ among the modems $(M_1, M_2, \ldots, M_N)$ for an emergency call based on the ECER feedback signals from the modems $(M_1, M_2, \ldots, M_N)$. Furthermore, the invention also relates to a corresponding communication device, a computer program, and a computer program product thereof.

20 Claims, 6 Drawing Sheets

METHOD FOR ESTABLISHMENT OF AN EMERGENCY CALL

CROSS-REFERENCE TO RELATED APPLICATIONS

This application is a continuation of International Patent Application No. PCT/EP2013/067390, filed on Aug. 21, 2013, which is hereby incorporated by reference in its entirety.

TECHNICAL FIELD

The present invention relates to a method in a communication device for establishment of an emergency call. Furthermore, the invention also relates to a corresponding communication device, a computer program, and a computer program product thereof.

BACKGROUND

Communication systems, such as Public Switched Telephone Networks (PSTN), cellular wireless networks (e.g. GSM, LTE, UMTS, CDMA), IP-telephony (Voice over IP, VoIP), offers the user emergency call services via an Application Programming Interface (API). In this context, the modem is referred to as the module that provides the API and interfaces the communication system. Examples of modems are:

PSTN modems, which is connected to the PSTN network/switch,

GSM, LTE, or other modems for wireless communication systems, which interface the GSM, LTE air interface, VoIP modems, which includes both the application (usually in software) and the IP provider, e.g. LAN, WLAN, Bluetooth, cellular network.

An application/user interface may have access to none, one, or several modems of each type of the ones listed above. As an example, a mobile telephone or a tablet offers emergency call services via several cellular networks, either one at a time using one SIM (e.g. GSM, UMTS, LTE, one at a time) or several SIMs at a time using dual/multiple SIMs. Besides that, a mobile telephone offers emergency call service via one or several VoIP modems, with a flexible IP provider; via the cellular networks or via WIFI, USB or Bluetooth. Another example is a portable or stationary computer, which may offer emergency call services via one or several VoIP modems.

The SIM card is a physical hardware of integrated circuit which is inserted in the mobile phone, and is provided in different sizes such as ordinary SIM, mini SIM, micro SIM, and nano SIM. The SIM comprises among other things the International Subscriber Identity (IMSI) and a related key which is used to identify and authenticate subscribers. The modem on the other hand is usually the software together with hardware which handles the air interface with the RAN/RAT and in this respect uses the SIM card in that purpose as described above.

When a mobile phone (or cellular phone, cell phone, etc.) has more than one Subscriber Identity Module (SIM), from here on referred to as Multiple SIM phone, one SIM is considered the primary SIM and the rest of the SIMs in the Multiple SIM phone are considered as secondary SIMs. Generally the user of the mobile phone selects which SIM that is the primary SIM depending on e.g. the cost plan, data rate requirements, etc.

The SIM may be connected to different mobile operators or different Radio Access Networks (RANs) of a wireless communication system. The RAN may support different Radio Access Technologies (RATs), such as E-UTRA (LTE), GSM, which provide different coverage, data rates, latency, etc.

According to prior art, when an emergency call (e.g. number 112, 911, etc. depending on country) is placed by the user on a Multiple SIM phone, mentioned phone tries over and over again to establish the emergency call on the primary SIM. Alternatively, the Multiple SIM phone tries to establish the emergency call on a secondary SIM, potentially failing resulting in a try on the next secondary SIM. The emergency call is placed on the primary SIM of a Multiple SIM phone, or if the primary SIM is out of coverage or establishment fails, on a secondary SIM in a predefined prioritization order, usually depending on the cost plan. In any case, the establishment of the emergency call is delayed for every non successful establishment. Further, in emergency situations there is a risk that the mobile phone tries to establish the emergency call on the primary SIM which is not possible due to overloaded network, low signal quality, or other issues. Moreover, even if the emergency call is established on the primary SIM, the emergency call may suffer from unacceptable voice quality or being dropped due to deteriorating signal levels, etc.

FIG. 1 shows a simplified system overview of a Multiple SIM phone supporting N number of modems indexed n (M_1, SIM_2, ..., SIM_N), where n and N are positive integers. Further, each SIM is mapped to its associated modem. Assume further that modem M_2 is the primary modem on the Multiple SIM phone. The Emergency Call Coordinator, which can be a module in the phone, co-ordinates the signalling related to Emergency Call Establishment.

FIG. 2 illustrates a prior art method in a communication device having multiple communication modems. The sequence of Emergency Call Establishment is established as:

The user places the emergency call by dialing a country specific emergency number, e.g. 911 or 112, via a User Interface (UI) of the Multiple SIM phone;

The Emergency Call Establishment is indicated to modem M_2 associated with the primary SIM_2; and Modem M_2 initiates the emergency call establishment procedure.

SUMMARY

An objective of the present invention is to provide a solution which mitigates or solves the drawbacks and problems of prior art solutions.

Another objective of the present invention is to provide a solution for establishment of reliable emergency calls and/or emergency calls having low latency in a communication system where the communication device comprises multiple communication modems.

According to a first aspect of the invention, the above mentioned objectives are achieved by a method in a communication device for establishment of an emergency call, said communication device being arranged to communicate within communication networks by means of communication modems; the method comprising the steps of:

sending an Emergency Call Establishment Request (ECER) to modems ($M_1, M_2, ..., M_N$) of said communication device upon receiving an emergency call initiation signal;

receiving at least one ECER feedback signal from each modem, the ECER feedback signal indicating at least one of a latency and/or a signal quality for a communication link associated with each modem; and selecting one modem $M_n$ among said modems for an emergency call based on the ECER feedback signals from said modems.

According to an embodiment of the present method the step of sending involves: sending the ECER to all modems of said communication device.

According to another embodiment of the present method the step of sending involves: sending the ECER to all modems simultaneously.

According to yet another embodiment of the present method the step of receiving is preceded by the step of: initiating, by each modem, an Emergency Call Establishment Procedure, ECEP, with its associated communication network. According to this embodiment the step of selecting is followed by the step of: immediately aborting all ECEPs except for an ECEP associated with said selected modem $M_n$. Furthermore, according to this embodiment the ECER feedback signal is based on the ECEP.

According to yet another embodiment of the present method said selected modem $M_n$ is the modem having the shortest latency and/or the best signal quality among said modems.

According to yet another embodiment of the present method said communication network is a wireless communication system. According to this embodiment said wireless communication system is a 3GPP or a 3GPP2 wireless communication system, such as GSM, E-UTRA, and CDMA 1x. Furthermore, according to this embodiment said modems are arranged to use any of the algorithms specified by the 3GPP, such as 44.018, 45.008, 25.133, 25.304, 25.331 and 36.304, or by the 3GPP2, such as C.S0005. Furthermore, according to this embodiment said signal quality further relates to any in the group comprising: received signal strength, received signal quality, signal-to-noise ratio, signal-to-interference ratio, bit error probability, and frame error probability.

According to yet another embodiment of the present method said emergency call initiation signal is triggered by a User Interface (UI) of said communication device.

According to yet another embodiment of the present method said communication device is any communication device in the group comprising: stationary computers, portable computers, tablet computers, and mobile phones.

According to yet another embodiment of the present method said modems are any modems in the group comprising: PSTN modems, VoIP modems, and modems for wireless communication systems.

Moreover, the present method may be comprised in a computer program which when run by processing means causes the processing means to execute the present method. A computer program product may comprise the computer program and a computer readable medium.

According to a second aspect of the invention, the above mentioned objectives are achieved with a communication device for establishment of an emergency call, said communication device comprising a transmitter, a receiver, and a processor; and said communication device being arranged to communicate within communication networks by means of communication modems of said communication device; said processor being arranged to:

send an Emergency Call Establishment Request (ECER) to modems ($M_1, M_2, \ldots, M_N$) of said communication device upon receiving an emergency call initiation signal;

receive at least one ECER feedback signal from each modem, the ECER feedback signal indicating at least one of a latency and/or a signal quality for a communication link associated with each modem; and select one modem $M_n$ among said modems for an emergency call based on the ECER feedback signals from said modems.

The present communication device may be modified, mutatis mutandis, according to the different embodiments of the present method.

The present invention provides a solution which makes it possible to optimise emergency call establishment based on the latency and/or the signal quality for different communication links in a communication device having multiple modems. Thereby, the emergency call selection in such communication devices may be prioritised on latency and/or signal quality.

Further applications and advantages of the invention will be apparent from the following detailed description.

BRIEF DESCRIPTION OF THE DRAWINGS

The appended drawings are intended to clarify and explain different embodiments of the present invention in which.

DETAILED DESCRIPTION OF THE INVENTION

Figure 1:
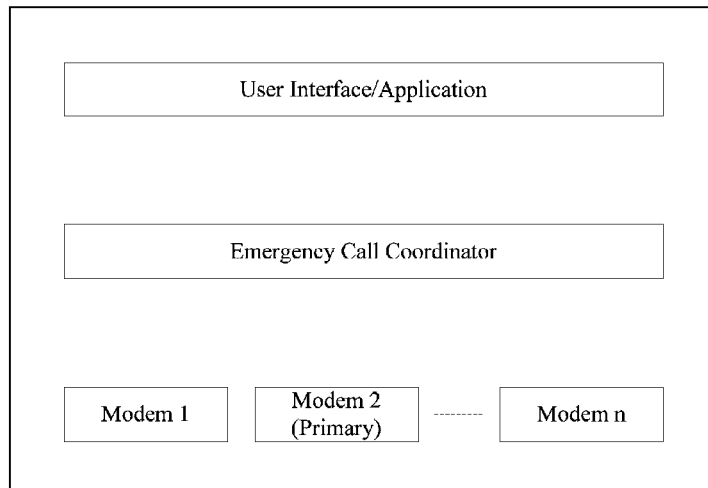
FIG. 1 shows a simplified diagram of a Multiple SIM phone.
Figure 2:
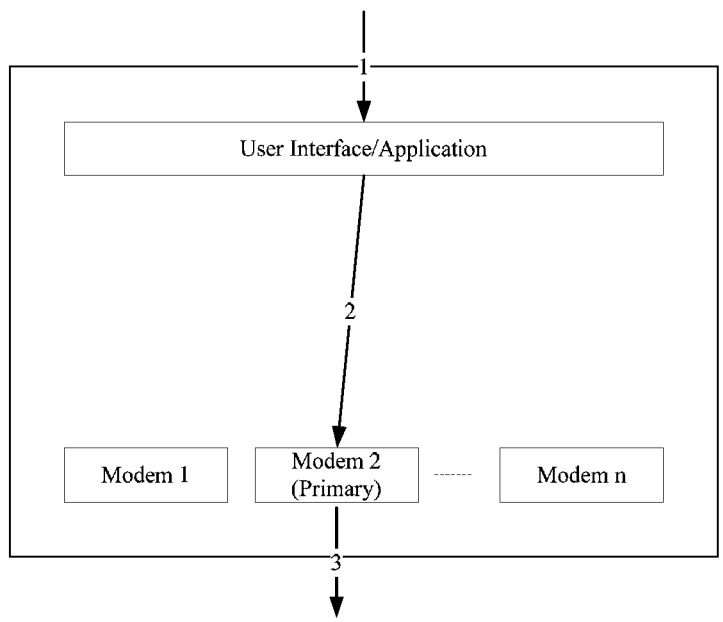
FIG. 2 illustrates prior art for Emergency Call Placement in a Multiple SIM phone.

According to the present method, when an emergency call is placed by the user of a communication device having multiple modems; the emergency call is established on only one modem among the multiple modems of the communication device based on latency and/or a signal quality for a communication link associated with the different modems. Hence, an Emergency Call Establishment Request (ECER) is sent to the modems and at least one ECER feedback signal is received from each modem. Finally, one modem is selected based on the ECER feedback signals which relates to the mentioned latency and/or a signal quality of the links Thereby, emergency call selection in such communication devices may be prioritised on latency and/or signal quality.

The emergency call initiation signal is according to an embodiment triggered by a User Interface of the communication device. For example, the user of the communication device may dial an emergency call number on a keypad (hardware or software such as in touch screens) of the communication device or operate dedicated means of the communication device in this respect such as a dedicated button or switch.

According to another embodiment of the invention the step of sending further involves sending the ECER to all modems, and even preferably the ECER are sent to all available modems of the communication device simultaneously.

Furthermore, when an emergency call is established on the selected modem, the other establishment requests associated with the other modems of the communication device are immediately aborted so as to avoiding emergency establishment with multiple emergency call operators.

According to an preferred embodiment of the present invention, the signal quality of the radio links during establishment of the emergency calls measured and used for selection of the modem to be used for the emergency call. This embodiment provides the best available voice quality and minimizes the risk for dropped emergency calls. The signal quality may relate to any in the group comprising: received signal strength, received signal quality, signal-to-noise ratio, signal-to-interference ratio, bit error probability, and frame error probability.

According to another embodiment the modem having the best (shortest) latency is selected. This embodiment provides emergency call having shortest latency which obviously is advantages. The latency can in this context be measured as the time from the emergency call placed by the user to the establishment of the emergency call which is a simple measure to implement in a communication device.

However, according to yet another embodiment of the invention the latency and signal quality aspects can be combined. This guarantees the shortest latency for establishment of emergency call, best available voice quality and minimizes the risk for dropped emergency calls. Hence, with the proposed solution, the shortest latency for establishment and/or best available connection (signal quality) is selected for emergency calls in a communication device having multiple modems. This reduces the latency for establishment and/or risk of dropped call and further improves the speech quality.

An idea with this embodiment is to place the emergency calls on the modem of the communication device that at the time for establishment of the emergency call has the shortest latency for establishment of emergency call and/or the best signal quality of a communication link among all communication links associated with the respective modems of the communication device. This minimizes the latency for establishment of emergency call and the risk of dropped call in an emergency situation due to network overload or weak signal on the primary modem.

Figure 3:
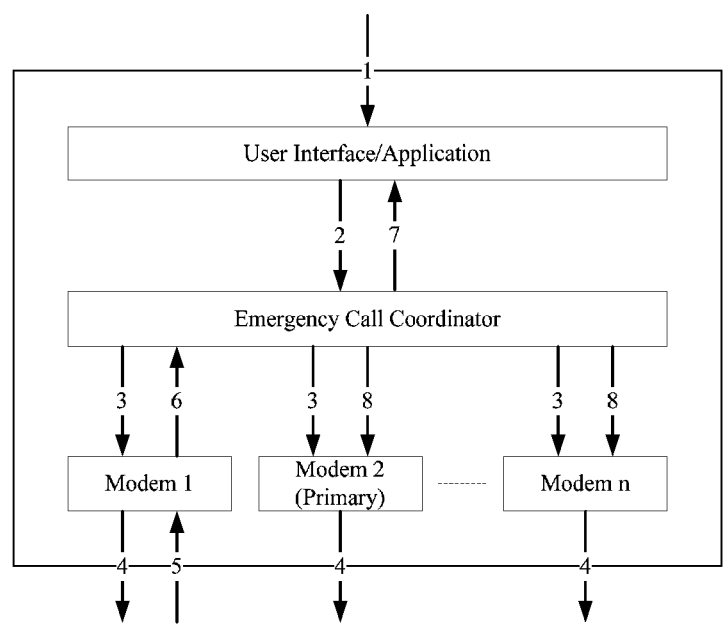
FIG. 3 illustrates an embodiment of present invention for Emergency Call Placement in a Multiple SIM Phone when considering latency.

An embodiment of the present method when the latency aspect is considered is illustrated in FIG. 3:
1. The user places an emergency call by dialling the country specific emergency number via the UI of the communication device;
2. The emergency call establishment is indicated to the Emergency Call Coordinator (ECC) by the UI;
3. The Emergency Call Coordinator sends an Emergency Call Establishment Request to all modems of the communication device simultaneously;
4. The modems of the communication device, i.e. M__1, M__2, . . . , M_n, initiate the emergency call establishment procedure. The modems establish emergency call individually, including several signalling steps with its communication network;
5. Modem M__1 receives (in this example) confirmation of establishment, i.e. the emergency call is established;
6. Modem M__1 indicates to the ECC that the emergency call is established;
7. The ECC indicates to the UI that the emergency call is established; and
8. The ECC requests the other modems of the communication device, M__2, . . . , M_n to abort the emergency establishments.

Figure 4:
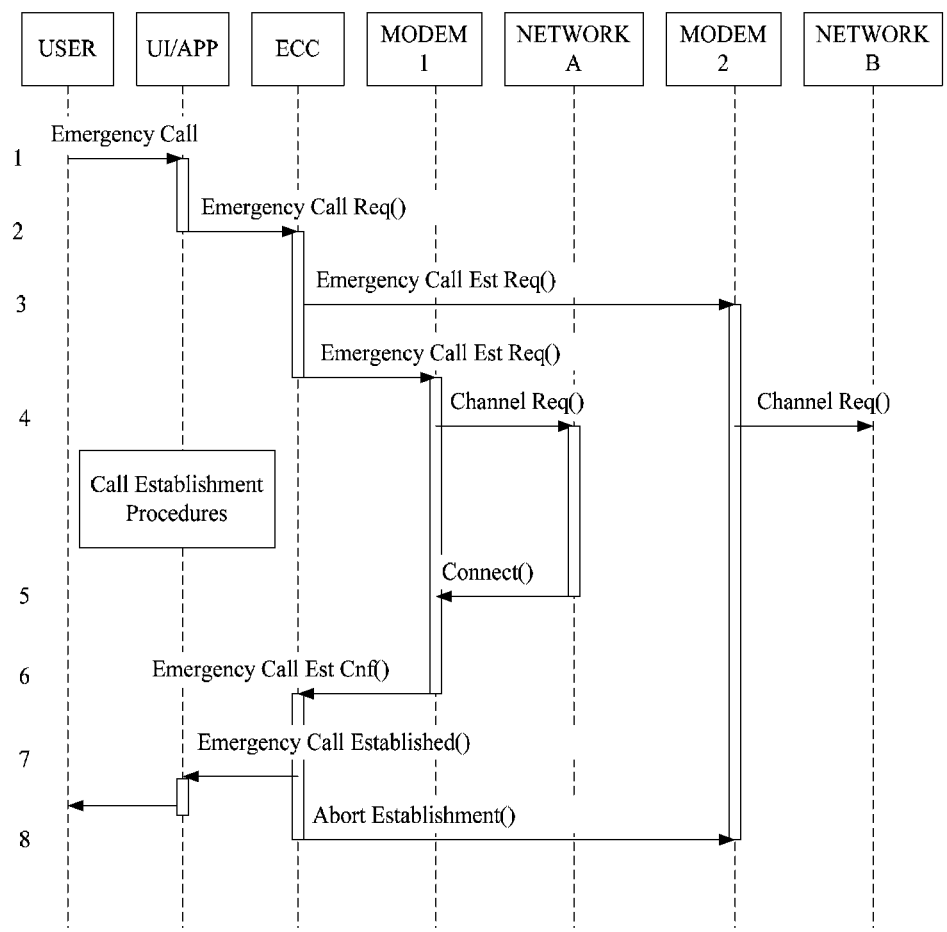
FIG. 4 Proposal of Emergency Call Placement in Multiple SIM Phone (or a communication device)

FIG. 4 illustrates a proposal of Emergency Call Placement in a communication device according to the invention. This example comprises the steps of:
1. The user places an emergency call by dialing the country specific emergency number via the UI of the communication device;
2. The emergency call establishment is indicated to the Emergency Call Coordinator (ECC);
3. The ECC sends an Emergency Call Establishment Request to all modems of the communication device simultaneously;
4. The modems of the communication device, i.e. M__1, M__2, . . . , M_n, initiate the emergency call establishment procedure. The modems establish emergency call individually, including several signalling steps with its communication network. In this example each modem sends a Channel Request to the respective network;
5. Modem M__1 receives confirmation of establishment, i.e. the emergency call is established;
6. Modem M__1 indicates to the ECC that the emergency call is established;
7. The ECC indicates to UI that the emergency call is established; and
8. The ECC requests the other modems of the communication device to abort the emergency establishments.

According to another embodiment of the present invention, the signal quality of the link for each modem is evaluated during the establishment procedures including abortion of establishment procedures if the link quality is non-acceptable.

In order to minimize the impact on the modems, the existing algorithms for modems, specified by 3GPP in 44.018, 45.008 (GSM), 25.133, 25.304, 25.331 (UMTS) and 36.304 (LTE) or 3GPP2 such as C.S0005, can be reused in the ECC for prioritization and abortion of establishment procedures for wireless communication systems according to mentioned standards. Correspondingly, existing algorithms for modems for other wired and wireless standard are preferably used to achieve the same advantage. Hence, it should be noted that the present invention is not restricted to use of the cell selection algorithms defined by 3GPP, nor to modems defined by 3GPP. Any algorithm can be used for selection of any type of modem.

Figure 5:
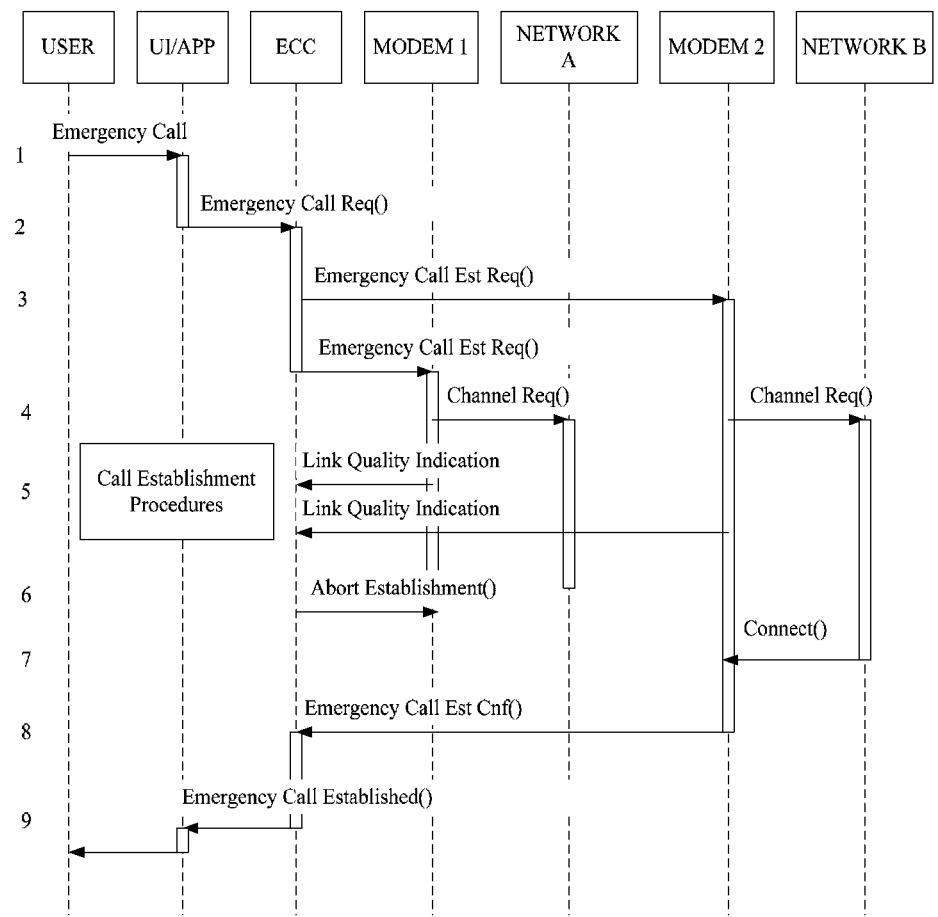
FIG. 5 illustrates the flows of an embodiment of the present invention.

FIG. 5 outlines the interactions between the ECC and the modems including evaluation of the link quality. The first 4 steps 1-4 are identical to steps 1-4 described above. Further, this embodiment thereafter comprises the steps of:
5. Each modem reports it associated link quality to the ECC;
6. The ECC evaluates the link quality reports from the modems and requests, in this case, Modem__1 to abort emergency call establishment;
7. Modem__2 receives confirmation of establishment, i.e. the emergency call is established;
8. Modem__2 indicates to the ECC that the emergency call is established; and
9. The ECC indicates to UI that the emergency call is established.

Furthermore, the present method can be implemented and executed in a suitable communication device. The device may be a stationary computers, portable computers, tablet computers, and mobile phones, but is not limited to the mentioned devices. Further, the modems may be one or more of PSTN modems, VoIP modems, or modems for wireless communication systems depending on the communication network(s).

Moreover, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Figure 6:
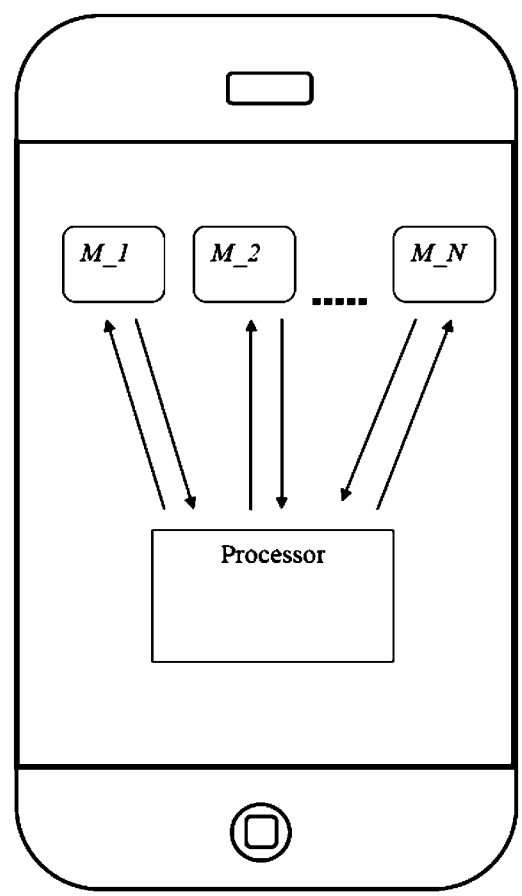
FIG. 6 illustrates an embodiment of a communication device according to the present invention.

The present invention further relates to a communication device comprising a receiver, a transmitter, multiple modems and a processer. The processor of the present communication device is arranged to send an ECER to modems ($M_1$, $M_2$, ..., $M_N$) of the communication device upon receiving an emergency call initiation signal; and receive at least one ECER feedback signal from each modem, the ECER feedback signal indicating at least one of a latency and/or a signal quality for a communication link associated with each modem. The processor is further arranged to select one modem $M_n$ among the modems of the communication device for an emergency call based on the ECER feedback signals from the modems. This communication device is illustrated in FIG. 6. As illustrated the communication device (in this case a mobile communication device) comprises a plurality of modems $M_1$, $M_2$, ..., $M_N$, and the processor is arranged to communication with the modems and is further arranged to select a modem according to the present method.

Figure 7:
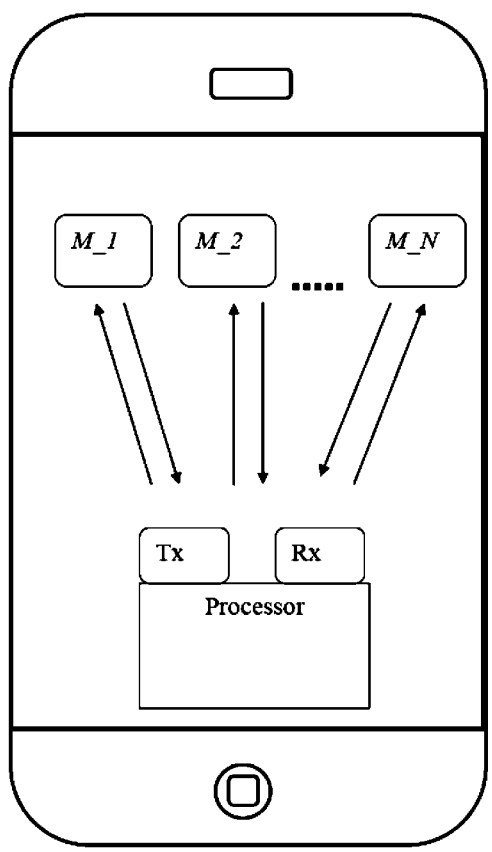
FIG. 7 illustrates an alternative embodiment of a communication device according to the present invention.

Alternatively, according to another embodiment of the invention the communication device may comprise a receiver unit, a transmitter unit, multiple modems and a processor. The transmitter unit is arranged to send an ECER to modems. The receiver unit is arranged to receive at least one ECER feedback signal from each modem. The processor is arranged to select one modem $M_n$ among the modems for an emergency call based on the ECER feedback signals from the modems. This embodiment is illustrated in FIG. 7 in which the communication device comprises a plurality of modems $M_1$, $M_2$, ..., $M_N$, and the processor is arranged to communication with the modems by means of a transmit unit (Tx) and a receive unit (Rx). The processor is further arranged to select a modem according to the present method.

It is further realised by the skilled person that the communication device may comprises other necessary communication capabilities in the form of e.g. functions, means, units, elements, etc. for executing the methods according to the invention which means that the devices can be modified, mutatis mutandis, according to any method of the present invention. Examples of other such means, units, elements and functions are: memory, encoders, decoders, mapping units, multipliers, interleavers, deinterleavers, modulators, demodulators, inputs, outputs, antennas, amplifiers, DSPs, etc. which are suitably arranged together.

Especially, the processors of the communication device may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

The invention claimed is:

1. A method for establishment of an emergency call by a communication device, the communication device configured to communicate within communication networks by communication modems, the method comprising:

sending an Emergency Call Establishment Request (ECER) to modems ($M_1$, $M_2$, ..., $M_N$) of the communication device upon receiving an emergency call initiation signal;

receiving at least one ECER feedback signal from each modem, the ECER feedback signal indicating at least one of a latency and a signal quality for a communication link associated with each modem; and selecting one modem $M_n$ among the modems ($M_1$, $M_2$, ..., $M_N$) for an emergency call based on the ECER feedback signals from the modems ($M_1$, $M_2$, ..., $M_N$).

2. The method according to claim 1, wherein the sending the ECER to the modems ($M_1$, $M_2$, ..., $M_N$) of the communication device comprises:

sending the ECER to all modems of the communication device.

3. The method according to claim 2, wherein the sending the ECER to the modems ($M_1$, $M_2$, ..., $M_N$) of the communication device comprises:

sending the ECER to all modems simultaneously.

4. The method according to claim 1, wherein before the receiving the at least one ECER feedback signal from each modem, the method comprises:

initiating, by each modem, an Emergency Call Establishment Procedure (ECEP) with its associated communication network.

5. The method according to claim 4, wherein after the selecting the modem $M_n$ among the modems ($M_1$, $M_2$, ..., $M_N$), the method comprises:

immediately aborting all ECEPs except for an ECEP associated with the selected modem $M_n$.

6. The method according to claim 4, wherein the ECER feedback signal is based on the ECEP.

7. The method according to claim 1, wherein the selected modem $M_n$ has at least one of a shortest latency and a best signal quality among the modems ($M_1$, $M_2$, ..., $M_N$).

8. The method according to claim 1, wherein the communication network is a wireless communication system.

9. The method according to claim 8, wherein the wireless communication system is a 3GPP or a 3GPP2 wireless communication system.

10. The method according to claim 9, wherein the modems ($M_1$, $M_2$, ..., $M_N$) are configured to use any of algorithms specified by the 3GPP.

11. The method according to claim 9, wherein the signal quality relates to one of the following: received signal strength, received signal quality, signal-to-noise ratio, signal-to-interference ratio, bit error probability, and frame error probability.

12. The method according to claim 1, wherein the emergency call initiation signal is triggered by a User Interface (UI) of the communication device.

13. The method according to claim 1, wherein the communication device is at least one of the following: a stationary computer, a portable computer, a tablet computer, and a mobile phone.

14. The method according to claim 1, wherein the modems ($M_1$, $M_2$, ..., $M_N$) are any modems in the group comprising: Public Switched Telephone Networks (PSTN) modems, Voice over IP (VoIP) modems, and modems for wireless communication systems.

15. A non-transitory computer readable medium storing a program causing a computer to execute a method in a communication device for establishment of an emergency call, the communication device configured to communicate within communication networks by communication modems; the method comprising:

sending an Emergency Call Establishment Request (ECER) to modems (M_1, M_2, ..., M_N) of the communication device upon receiving an emergency call initiation signal;

receiving at least one ECER feedback signal from each modem, the ECER feedback signal indicating at least one of a latency and a signal quality for a communication link associated with each modem; and selecting one modem M_n among the modems (M_1, M_2, ..., M_N) for an emergency call based on the ECER feedback signals from the modems (M_1, M_2, ..., M_N).

16. A communication device for establishment of an emergency call, the communication device comprising a transmitter, a receiver, and a processor; and the communication device configured to communicate within communication networks by communication modems of the communication device; wherein the processor is configured to:

send an Emergency Call Establishment Request (ECER) to modems ($M_1, M_2, \ldots, M_N$) of said communication device upon receiving an emergency call initiation signal;

receive at least one ECER feedback signal from each modem, the ECER feedback signal indicating at least one of a latency and/or a signal quality for a communication link associated with each modem; and select one modem $M_n$ among the modems ($M_1, M_2, \ldots, M_N$) for an emergency call based on the ECER feedback signals from the modems ($M_1, M_2, \ldots, M_N$).

17. The communication device according to claim 16, wherein processor is configured to:

send the ECER to all modems of the communication device upon receiving the emergency call initiation signal.

18. The communication device according to claim 17, wherein processor is further configured to:

send the ECER to all modems simultaneously.

19. The communication device according to claim 16, wherein the selected modem $M_n$ has at least one of a shortest latency and a best signal quality among the modems ($M_1, M_2, \ldots, M_N$).

20. The communication device according to claim 16, wherein the modems ($M_1, M_2, \ldots, M_N$) are any modems in the group comprising: Public Switched Telephone Networks (PSTN) modems, Voice over IP (VoIP) modems, and modems for wireless communication systems.

\* \* \* \* \*

UNITED STATES PATENT AND TRADEMARK OFFICE
CERTIFICATE OF CORRECTION

PATENT NO.        : 9,154,932 B2  
APPLICATION NO.   : 14/186666  
DATED             : October 6, 2015  
INVENTOR(S)       : Huang et al.

Page 1 of 1

It is certified that error appears in the above-identified patent and that said Letters Patent is hereby corrected as shown below:

Title page, Item (63), the filing date of International Application No. PCT/EP2013/067390 should read -- Aug. 21, 2013 --.

Signed and Sealed this
Sixteenth Day of February, 2016

Michelle K. Lee
*Director of the United States Patent and Trademark Office*